Nov. 17, 1964   J. V. BARNES   3,157,052
ANTI-SKID BRAKE SYSTEM
Filed July 3, 1961   3 Sheets-Sheet 1
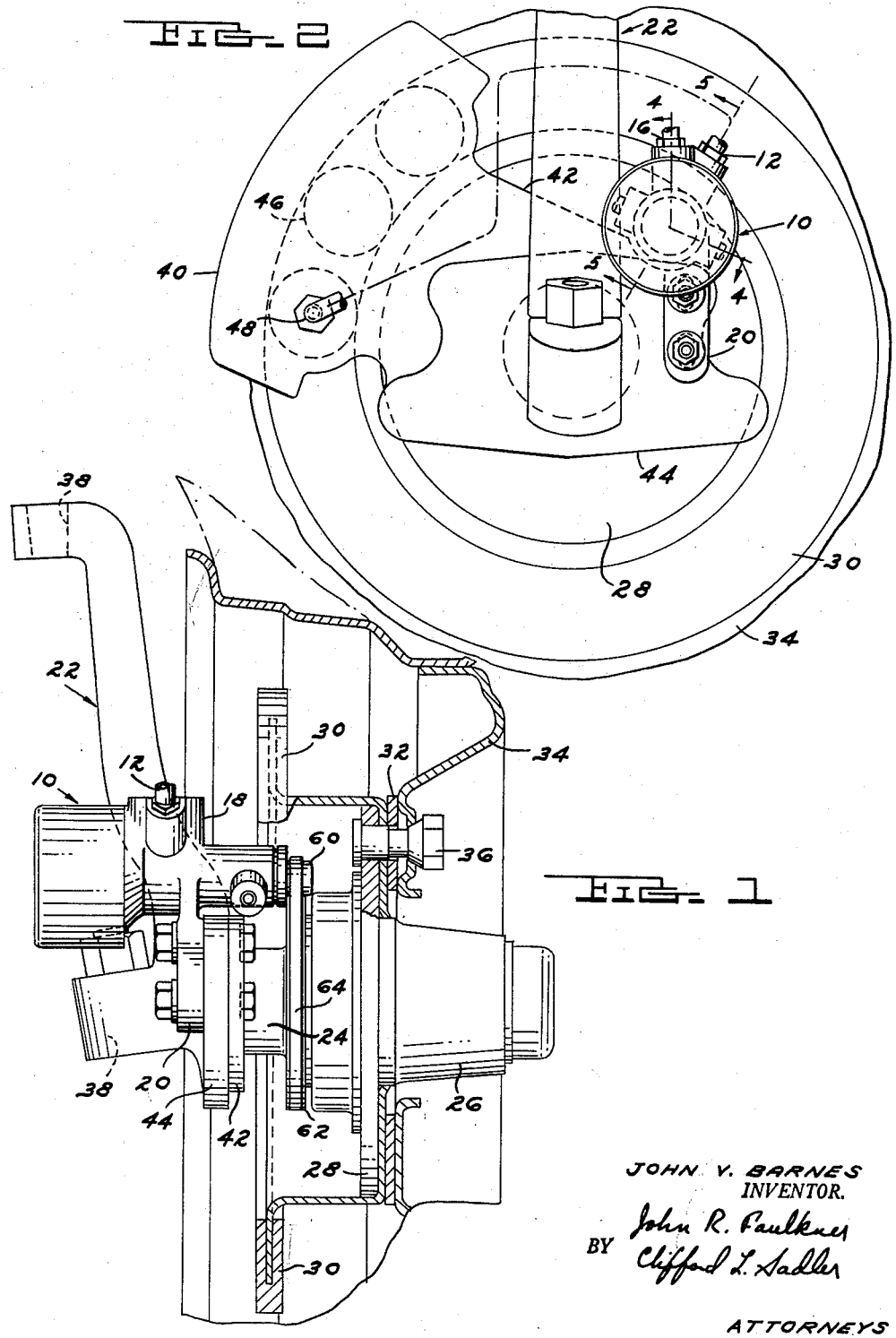
JOHN V. BARNES
INVENTOR.
BY John R. Faulkner
Clifford L. Sadler
ATTORNEYS

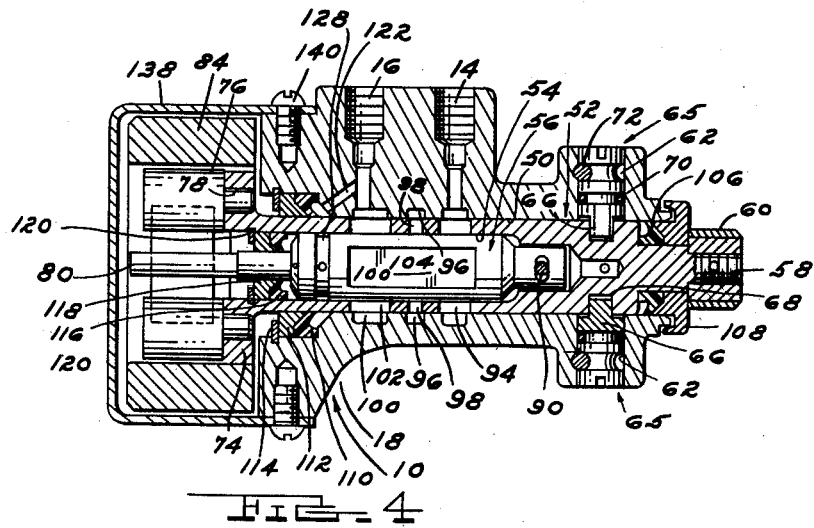
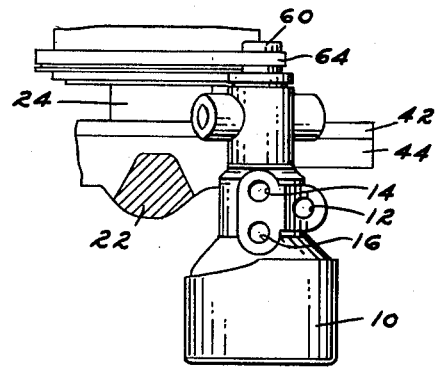
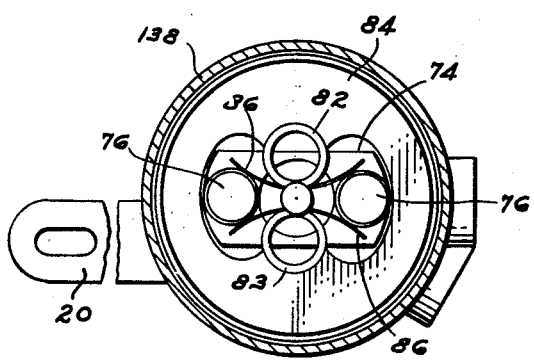
JOHN V. BARNES
INVENTOR.

Nov. 17, 1964   J. V. BARNES   3,157,052
ANTI-SKID BRAKE SYSTEM
Filed July 3, 1961   3 Sheets-Sheet 3
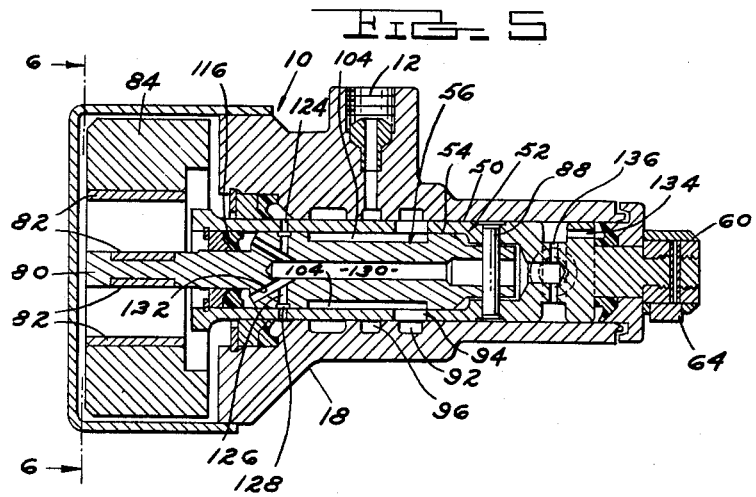
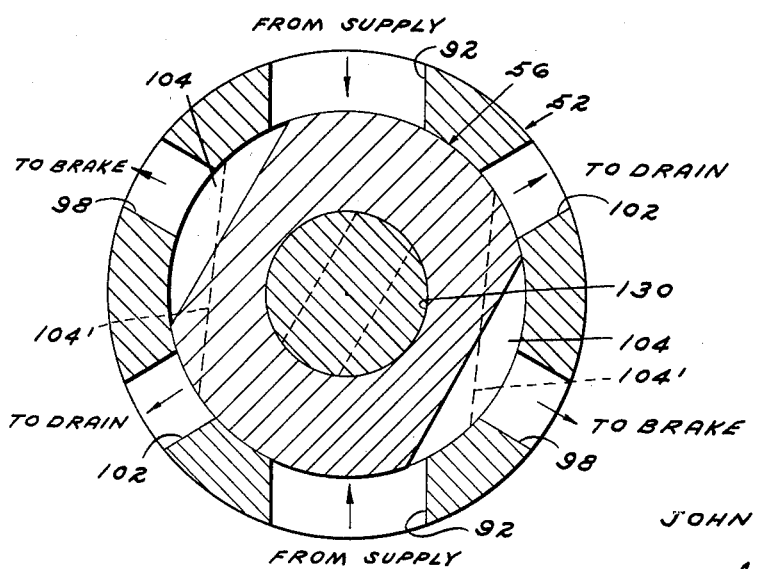
JOHN V. BARNES
INVENTOR.
BY John R. Faulkner
Clifford L. Sadler
ATTORNEYS

United States Patent Office 3,157,052
Patented Nov. 17, 1964

---

3,157,052
ANTI-SKID BRAKE SYSTEM
John V. Barnes, Detroit, Mich., assignor to Ford Motor Company, Dearborn, Mich., a corporation of Delaware
Filed July 3, 1961, Ser. No. 121,457
1 Claim. (Cl. 73—514)

The present invention relates to vehicle brake systems and more particularly to a sensor unit forming a part of an anti-skid brake system.

An anti-skid brake system can be defined as a system wherein brake torque is automatically limited to exactly that amount necessary to produce incipient wheel lock regardless of the variation in frictional properties of the road. The prevention of wheel lock is sought in order to eliminate the loss of directional control which is characteristic of a locked wheel. An additional advantage is the potential reduction of vehicle stopping distance. This feature is attributed to the phenomena of a peak coefficient of friction between tire and road at considerably less than one hundred percent slip.

Recognizing that road characteristics vary in a random fashion, it is necessary to measure continuously how each wheel is reacting to braking and to automatically modify individual wheel brake force accordingly. This arrangement permits each wheel to contribute the maximum possible braking force and directional stability for any road condition.

The present invention is directed to a sensor unit located at the vehicle wheel and incorporated in a full power hydraulic brake system. The unique unit is in part, a valve device that modulates hydraulic pressure flow to the brake actuating cylinder in response to wheel deceleration.

More specifically, the present invention provides a unique sensor unit containing inner and outer concentric valve parts. These valve parts are contained within a housing which is appropriately mounted on wheel support structure. The outer valve part is connected to the wheel for rotation. The inner valve part has a flywheel portion which is driven by the outer part through a pair of leaf springs. Thus, as the outer valve part rotates with the wheel it drives the inner part through the leaf springs, however, the flywheel and spring arrangement determines their relative angular relationship in response to wheel deceleration.

During brake application, the inner valve part will tend to over travel the outer part because of the inertia of its flywheel. The leaf springs resist this over travel. If the deceleration of the outer valve part is too fast, that is, it approaches incipient wheel lock, sufficient relative angular movement will occur between the parts to choke off the flow of pressure fluid to the wheel brake cylinders. This in turn will reduce wheel deceleration and tend to return the valve parts to their normal position.

Thus, a sensor unit is provided at a vehicle wheel which contains inner and outer valve parts that are both driven at wheel speed and their relative angular relationship determines the amount of fluid pressure flow permitted to reach the wheel brake cylinder.

These and further objects of the present invention will become apparent upon detail consideration of the following description and the accompanying drawings in which:

FIGURE 1 is a rear elevational view of a front wheel of an automobile incorporating the sensor unit of the present invention;

FIGURE 2 is a side elevational view of the structure of FIGURE 1;

FIGURE 3 is a top plan view of the structure of FIGURE 1;

FIGURE 4 is a sectional view of the sensor unit taken along section lines 4—4 of FIGURE 2;

FIGURE 5 is a sectional view taken along section lines 5—5 of FIGURE 2;

FIGURE 6 is a sectional view taken along section lines 6—6 of FIGURE 5, and ;

FIGURE 7 is a schematic sectional view of the valve mechanism.

Referring now to the drawings for a more detailed description of the present invention wherein like reference numerals identify like parts throughout the various views, FIGURE 1 discloses, in elevation, a left front automobile wheel and support structure having a brake control sensor unit 10 associated therewith. The sensor unit 10 constitutes the presently preferred embodiment of this invention. Although the unit 10 is shown with independent front wheel structure it is equally applicable to solid axle rear wheel constructions.

As previously explained, the sensor unit 10 is provided in association with a full pressure brake system having a pressure fluid supply line and a low pressure return or drain line. In its normal position, the control unit 10 permits free flow of pressure fluid from the supply to the hydraulic cylinders of the brake. However, if the unit senses excessive wheel deceleration, fluid flow to the brake is cut off and hydraulic pressure in the brake portion of the circuit is dumped to the drain outlet. To perform these functions the unit 10 has a conduit fitting 12 for connection to a brake cylinder, an inlet 14 that is connected to the supply pressure and an outlet 16 connected to the low pressure drain.

The unit 10 has a housing 18 that is provided with an integral bracket 20 for attachment to relatively stationary wheel support structure such as the wheel spindle 22 disclosed in FIGURE 1. The spindle 22 has a spindle shaft 24 extending therefrom upon which a wheel bearing housing 26 is rotatably mounted. The bearing housing 26 has a flanged portion 28 to which a hat-shaped brake disc 30, a spacer 32 and a wheel 34 are secured by a plurality of studs such as 36. The wheel 34 is adapted to receive a ground engaging pneumatic tire.

The spindle 22 has upper and lower bores 38 that receive the studs of suspension ball joints. The ball joints serve as the connecting elements securing the spindle 22 to the upper and lower suspension arms of a vehicle chassis. A steering arm (not shown) is also connected to the spindle 22.

The present invention is disclosed in association with a caliper type spot disc brake. This brake has a housing 40 which surrounds the periphery of the brake disc 30. A flanged portion 42 extends from the housing 40 and is bolted to a flanged portion 44 formed integrally of the spindle 22. The brake housing 40 contains a series of opposed spot-like pistons having friction surfaces engaging the disc 30. The pistons are contained in hydraulic cylinders 46 which are all in communication with a pressure inlet 48.

Acting under the influence of hydraulic fluid admitted through the inlet 48, the brake pistons trap the disc 30 with a caliper-like action and retard its rotation. In order to prevent wheel skid, the sensor unit 10 is provided to sense the rate of deceleration of the wheel 34 and to prevent fluid flow to the brake cylinders 46 in the event the wheel deceleration rate should become so great as to indicate incipient wheel lock.

The housing 18 contains a central bore 50 into which an outer valve part or drive shaft 52 is journaled. The valve part 52 in turn has a central bore 54 in which an inner valve part or inertia shaft 56 is concentrically contained.

Piece 52 functions as both an outer valve member and a drive shaft for the inner valve member 56. It will be referred to as merely the outer valve part hereinafter. Similarly, member 56 constitutes both a valve element and an inertia shaft because of its greater mass but will be referred to as the inner valve part.

The outer valve part 52 has a threaded end 58 upon which a small pulley 60 is secured. The pulley 60 is in line with a second pulley 62 carried by the wheel housing 26. The pulleys 60 and 62 are selected to permit a flexible belt 64 to rotate the pulley 60 and the outer valve part 52 at a direct multiple of wheel speed.

One end of the housing 18 is provided with a pair of axially aligned bores 62 into which a pair of soft metal bearing pieces 65 are fitted. The bearings 65 have a tongue portion 66 which engages a groove 68 provided in the outer valve part 52. The pieces 65 and their engagement with the groove 68 constitutes a thrust bearing device that locate valve member 52 axially. Pieces 65 have an inner groove receiving an O-ring seal 70 and an outer groove that is engaged by a retaining pin 72 passing through the adjacent portion of the housing 18.

Means are provided for drivingly connecting the inner valve part 56 to the outer valve part 52 and maintaining an angular relationship therebetween responsive to the amount of wheel deceleration.

The outer valve part 52 has a flanged end 74 supporting a pair of spaced apart cylindrical members 76. Members 76 each have an end portion 78 of reduced diameter that is secured in the radially extending flange 74. The inner valve part 56 has a shaft-like protruding end portion 80 to which a pair of tubular pieces 82 and 83 are secured.

An annular flywheel 84 surrounds the flanged end 74 and cylindrical pieces 76. The flywheel 84 is formed to be secured to the tubular members 82 and 83. A pair of leaf springs 86 are trapped between the tubular pieces 82, 83 and the shaft extension 80 of the inner valve part 56.

A diametral pin 88 extends through the outer valve part 52 and through a slot 90 provided in the inner valve part 56. Pin 88 maintains the correct axial relationship between the outer valve part 52 and the inner valve part 56.

Thus, the foregoing structure provides an inner valve part 56 having a shaft extension 80 with tubular pieces 82 an 83, flywheel 84 and leaf spring members 86 secured thereto. The leaf spring members 86 serve as driving members or connecting elements between the inner and outer valve parts 56 and 52. Upon rotation of the outer part 52, the inner part 56 will be driven through the springs 86. In the event of a rapid slow down of the outer part 52, the springs 86 will flex and the flywheel 84 will cause the inner valve parts to over travel the outer valve part 52 and establishing an angular relationship.

The weight of the flywheel 84, the shape and size of pieces 76, 82 and 83, and the characteristics of the springs 86 are selected so that the amount of the over travel and the angular relationship established between the inner and outer valve parts 56 and 52 is appropriately related to the amount of wheel deceleration.

The foregoing description presents the mechanical attributes of the sensor unit 10. The following will cover the hydraulic aspects.

The brake outlet 12, supply inlet 14 and drain outlet 16 are directly connected by radial passageways provided in the housing 18 to three serially situated circumferential grooves provided in the bore 50. Groove 92 is connected to the supply inlet 14 and is in alignment with ports 94 provided in the wall of the outer valve part 52. Brake outlet 12 is connected by a radial passageway to a circumferential groove 96 which is in communication with openings 98 in the wall of valve part 52. Drain outlet 16 is joined by a groove 100 which in turn connects with openings 102 of the outer valve part.

FIGURE 4 discloses the openings 94, 98 and 102 in the wall of the outer valve part 52 as being in the same plane. This is done for illustration and identification purposes only. In fact, they are disposed in an angular relationship similar to that indicated in FIGURE 7 as will be more fully described.

The inner valve 56 is machined to have a pair of flat sides forming axial passageways 104. This pirmits controlled communication between the ports 94, 98 and 102.

Appropriate seals are provided to contain fluid within the valve assembly. The driving end of the outer valve part 52 has a flexible sealing element 106 which is positioned by an end piece 108. Piece 108 in turn is retained by the threaded-on pulley 60. The flexible piece 106 provides a seal at the right hand end of the unit 10 between the valve part 52 and the bore 50.

At the flywheel end of the unit 10, a flexible piece 110 and a backup ring 112 seal the outer circumference of the outer valve part 52. These elements are held in place by snap ring 114. The surface between the inner diameter of the valve part 52 and the inner valve member 56 is sealed by flexible member 116, backup piece 118 and a retaining snap ring 120.

The outlet 16 which is connected to the drain is in communication with the three aforementioned seals. A diagonal passageway 122 is provided to communicate directly with the space in front of the flexible seal 110. The outer valve part 52 has openings 124 in communication with that seal and also in communication with radial holes 126 and a circumferential groove 128 of the inner valve part. The radial passageways 126 terminate at an axial bore 130 provided in the center of the inner valve part 56.

Diagonal passageways 132 provided communication between the inboard side of the flexible seal 116 and the main passageway 130 which is also in communication with the inboard side of the seal 106 by means of small holes 134 and 136 drilled in the valve part 52. Thus, any fluid leaking to the area of the seals will eventually be returned to the drain.

Finally, the flywheel is contained by a cup-shaped enclosure 138 that is retained by appropriate means such as machine screws 140.

Referring now to FIGURE 7 for a schematic representation of the valve, it is noted that the ports 92, 98 and 102 in the outer valve piece 52 are provided in pairs for hydraulic balance.

FIGURE 7 discloses the normal relationship of the inner and outer valve parts 56 and 52. The passageways 104 allow communication of pressure fluid entering from the supply ports 92 and exiting through the ports 98 to the brakes by means of an appropriate conduit (not shown) to the brake inlet 48 of FIGURE 2. Thus upon actuation by the vehicle operator of an appropriate control, hydraulic fluid is forced through the unit 10 to the brake cylinders 46 and the wheel 34 will begin to decelerate.

Normally, both the inner and outer valve parts 56 and 52 are being driven at a speed directly proportioned to wheel speed. When the abovementioned fluid flow actuates the brake to reduce wheel speed, the outer valve part 52 will slow up accordingly. The inner valve part 56 will tend to over travel the outer valve part 52 because of the inertia of the flywheel 84, and establish a new angular relationship between the two parts. This angular relationship is related non-linearly to the amount of wheel deceleration. The non-linearity of the relationship being due to the fashion in which the leaf spring elements 86 wrap around cylinders 76 as the parts 52 and 56 rotate relatively.

If the extent of wheel deceleration is so great as to indicate incipient wheel lock, the flat portions 104 will assume the dotted line position 104'. When the inner part 56 is turned to the angle of 104', the brake outlets 98 are in communication with the drain ports 102 and as a consequence, dumping of pressure fluid from the wheel cylinders 46 will occur. At the same time, the supply inlet ports 92 are blocked. Wheel deceleration will immediately stop and the inner and outer valve parts 56, 52 will return to their original position. Pressure will then be reapplied from the supply ports 92 to the brake ports 98. This condition will continue until the vehicle is brought to a halt or the operator releases his brake control.

The relationship of supply port 92, drain ports 102, and the flats 104 is such that upon angular displacement of the inner valve part 56, the supply ports 92 will close before the drain ports 102 will be opened. As a result, during moderate amounts of wheel deceleration the flow of fluid through the supply ports 92 to the brake ports 98 will be choked by partial closing or slight angular displacement of the flat 104. This will usually accomplish a sufficient reduction in pressure flow to the brake. The inner valve part 56 will not rotate to the position indicated by the dotted line 104′ to dump fluid from the brake port 98 except under very extreme circumstances.

The acceleration sensor portion of the unit comprising the flywheel 94, the cylindrical members 82 and 83, cylindrical pins 76 and leaf spring elements 86 provides a unique accelerometer controlling the concentric valve bodies 52, 56. The flat leaf spring energy storage members 86 achieve unusual accuracy in the accelerometer without being difficult to manufacture and acceptable to commercial tolerances. The use of cylindrical pins 76 to wrap the leaf springs 86 around the cylinders 82 achieves a high degree of nonlinearity for the sensing unit. The configuration of the sensor results in complete discrimination of signals because only angular acceleration in a single plane can influence it. It is not influenced by linear acceleration or shock loads.

The foregoing description constitutes the presently preferred embodiment of this invention. Modifications and other embodiments may occur to those skilled in the art which will come within the scope and spirit of the invention as defined in the following claim.

I claim:

An accelerometer adapted to actuate a control device sensitive to angular displacement between a rotatably mounted driving member and a rotatably mounted inertia member, said members having a common axis of rotation, said inertia member having a pair of leaf springs secured thereto with their centers adjacent said axis and their ends extending outwardly from said axis, a cylindrical element positioned adjacent the center of each of said leaf springs radially outwardly of said axis and secured to said inertia member, a pair of cylindrical pins spaced approximately ninety degrees with respect to said cylindrical elements and secured to said driving member, each of said pins being interposed between and engaging a pair of adjacent ends of said leaf springs, said pins being adapted to wrap one end of each of said leaf springs around said cylindrical elements upon angular displacement of said members in one direction and to wrap the other of said ends of said leaf springs around said cylindrical elements upon angular displacement in the opposite direction.

References Cited in the file of this patent

UNITED STATES PATENTS

| | | |
|---|---|---|
| 1,332,962 | Tibbetts | Mar. 9, 1920 |
| 1,952,232 | Axien | Mar. 27, 1934 |
| 2,346,856 | Martin | Apr. 18, 1944 |
| 2,365,180 | Eksergian | Dec. 19, 1944 |
| 2,698,021 | Bricker et al. | Dec. 28, 1954 |
| 2,948,152 | Meyer | Aug. 9, 1960 |
| 3,013,413 | Luning | Dec. 19, 1961 |
| 3,029,906 | Gauley | Apr. 17, 1962 |

FOREIGN PATENTS

| | | |
|---|---|---|
| 85,550 | France | May 4, 1869 |
| 373,263 | Italy | July 22, 1939 |
| 231,093 | Switzerland | May 16, 1944 |